Patented July 12, 1932

1,866,532

UNITED STATES PATENT OFFICE

JOSEPH F. HASKINS, OF KENMORE, NEW YORK, ASSIGNOR TO DU PONT RAYON COMPANY, OF BUFFALO, NEW YORK, A CORPORATION OF DELAWARE

ESTERIFICATION OF CELLULOSE

No Drawing.  Application filed April 25, 1930. Serial No. 447,425.

This invention relates to the preparation of cellulose esters. More particularly the invention relates to the catalyzation of the process of preparing cellulose esters in basic media.

This invention will be described with particular reference to cellulose acetate but it is to be understood that it is equally applicable to the production of other cellulose esters.

Generally speaking, there are two methods of preparing cellulose esters, such as cellulose acetate. In the first of these processes a cellulose is treated in an acid media, and in the presence of a catalyst, with material such as acetic anhydride or acetyl chloride which is capable of forming the esters. The medium is usually acetic acid and the catalyst is usually sulfuric acid.

In the second method of esterification a cellulose is esterified by the action of acid chlorides in a basic reaction medium which is normally a tertiary amine such as pyridine. In this process acid anhydrides have previously been tried as the esterifying reagent but their action has been so slow that their use in the process has been unsatisfactory. This second method of esterification is, however, superior to the first method in this that it does not materially degrade the cellulose, whereas the sulfuric acid catalyst in the first process does materially degrade the cellulose.

In these methods the cellulose used may be undegraded, or it may be degraded to the state of hydrocellulose or oxycellulose, or it may be a partially etherified or esterified cellulose. Consequently, the term "a cellulose" as used in this specification is intended to refer to all such cellulose raw materials.

It is an object of this invention to improve the process of esterifying a cellulose in basic media by means of an acid anhydride. Another object of the invention is the catalyzation of the said process for the purpose of increasing the rapidity with which the reaction proceeds. Another object of the invention is the use and control of the process to produce an organic acid ester of cellulose or an inorganic acid ester of cellulose, or a mixed ester of organic and inorganic acids. Other objects of the invention will be in part apparent and in part pointed out as the description proceeds.

These objects are accomplished, generally, speaking by catalyzing the process of esterification of a cellulose in pyridine by means of pyridine sulfate.

In general my process is carried out by reacting a cellulose with an acid anhydride, such as acetic anhydride, in pyridine, in the presence of pyridine sulfate. The product of the reaction is essentially an organic ester of cellulose, a cellulose sulfate, or a mixed cellulose ester of sulfuric acid and an organic acid such as cellulose aceto sulfate.

I have found it possible to vary the composition of the resulting product within wide limits so that it is at one extreme substantially an organic acid ester of cellulose, and at the other extreme is essentially a sulfuric acid ester of cellulose. I produce this variation in composition by varying the proportions of the anhydride and the pyridine sulfate which are used in the reaction. Where there is a molar excess of acetic anhydride over sulfuric acid in the form of its pyridine salt the product is a mixed ester of cellulose with the acid whose anhydride is used, and with sulfuric acid. The relative proportions depend on the relative amounts of the salt and of the anhydride used. Where there is not a molar excess of anhydride over sulfuric acid in the form of its pyridine salt, the product is essentially a sulfuric acid ester of cellulose.

Although I have mentioned pyridine as the preferred basic medium and pyridine sulfate as the preferred catalyst, it is to be understood that equivalents of these compounds may be used.

The following examples are illustrated and not limitative of the invention.

Example I

To 59 parts of pyridine were added carefully 1.12 parts of 96% sulfuric acid. To this mixture were added 25.5 parts of acetic anhydride and 8.1 parts of cotton linters pulp. The mixture was heated with stirring under a reflux condenser in a bath heated to 100° C. for two hours, then at the boiling temperature (about 120° C.) for four hours, until a clear viscous solution was obtained. This solution was poured slowly, with stirring, into water, where it coagulated. The product was filtered off, extracted with alcohol and dried at 70° C. Analysis showed 39.27% acetyl and 1.98% sulphonyl.

*Example II*

To 58 parts by weight of pyridine were added carefully 2.4 parts of sulfuric acid (96%), 25.5 parts acetic anhydride and 8.1 parts of cotton linters pulp. The mixture was heated at 100°–110° C. until it went into solution (6 hours). The resulting solution was poured into water while stirring and washed well with water and dried. For purpose of analysis a part of this was dissolved in alcohol reprecipitated in water and dried. The resulting product which is soluble in alcohol gave, on analysis 32.18% acetyl and 9.26% sulphonyl.

*Example III*

44.7 parts of 96% sulfuric acid were added carefully to 160 parts of pyridine, 44 parts of acetic anhydride and 24 parts of cellulose were added. The mixture was heated with occasional stirring at 100° C. for six hours. The excess liquid was squeezed off and the product extracted several times with alcohol. Analysis showed .85% acetyl and 18.37% sulphonyl.

*Example IV*

To 5.8 parts of pyridine were added, carefully, 0.1225 part of 96% sulfuric acid, 3.94 parts of butyric anhydride and 0.81 parts of cotton linters pulp. The mixture was put in a sealed glass tube and heated at 130° C. for 20 hours at which time a clear viscous solution was obtained. To this, after cooling was added an equal volume of pyridine and the mixture, after stirring was poured slowly into water while stirring. The white coagulated material so obtained was thoroughly washed with water and dried at 70° C. Analysis showed 55% butyryl and 2.27% sulphonyl.

I believe that pyridine sulfate in pyridine produces these results because it forms a pyridine acid sulfate even in the presence of excess pyridine, and I believe that other amines which are also capable of forming acid sulfates in the presence of an excess of the amine or pyridine will also produce the same results. This, however, is theory only, and is not limitative of the invention should some other theory be found correct.

By means of my invention it is possible to produce cellulose esters in basic media in commercial quantities. Other advantages will be apparent from a reading of the specification.

As many apparently widely different embodiments of this invention may be made without departing from the spirit and scope thereof, it is to be understood that I do not limit myself to the specific embodiments thereof except as defined in the appended claims.

I claim:

1. A method of esterifying a cellulose comprising treating it in a medium comprising pyridine with an organic acid anhydride and pyridine sulfate.

2. A method of esterifying a cellulose comprising treating it in a medium comprising pyridine with acetic anhydride and pyridine sulfate.

3. A method of esterifying a cellulose comprising treating about 8 parts of cellulose with about 25.5 parts of acetic anhydride and with about 59 parts of pyridine to which has been added about 1.12 parts of 96% sulfuric acid.

4. A method of esterifying a cellulose which comprises treating it in a medium comprising pyridine with butyric anhydride and pyridine sulfate.

5. The method of esterifying a cellulose which comprises heating about 1.81 parts of cellulose in a mixture of about 5.8 parts of pyridine, about .12 part of 96% sulfuric acid, and about 3.9 parts of butyric anhydride.

6. The method of preparing an ester of cellulose which comprises heating about 24 parts of cellulose with a mixture of about 44 parts of 96% sulfuric acid, about 160 parts of pyridine, and about 44 parts of acetic anhydride.

7. The method of preparing an ester of cellulose which is substantially cellulose sulfate which comprises reacting a cellulose with a mixture of sulfuric acid, pyridine, and an organic acid anhydride in which there is not a molar excess of anhydride over sulfuric acid in the form of its pyridine salt.

In testimony whereof, I affix my signature.

JOSEPH F. HASKINS.